United States Patent [19]

Dehne

[11] 4,354,434
[45] Oct. 19, 1982

[54] TRACK AND SWITCH CONSTRUCTION FOR SELF-PROPELLED VEHICLES

[75] Inventor: Clarence A. Dehne, Farmington Hills, Mich.

[73] Assignee: Jervis B. Webb Company, Farmington Hills, Mich.

[21] Appl. No.: 128,381

[22] Filed: Mar. 10, 1980

Related U.S. Application Data

[63] Continuation of Ser. No. 892,774, Apr. 3, 1978, abandoned.

[51] Int. Cl.³ .............................................. E01B 25/26
[52] U.S. Cl. ........................................ 104/103; 191/38
[58] Field of Search .......................... 104/94, 96, 103; 191/38

[56] References Cited

U.S. PATENT DOCUMENTS

| 2,222,356 | 11/1940 | Nelles | 104/103 |
| 2,714,355 | 8/1955 | Benson | 191/38 |
| 3,464,364 | 9/1969 | Dehne | 104/96 |
| 3,646,613 | 2/1972 | Matsumoto et al. | 104/94 |

FOREIGN PATENT DOCUMENTS

| 539189 | 7/1955 | Belgium | 104/103 |
| 1105455 | 4/1961 | Fed. Rep. of Germany | 191/38 |
| 431649 | 8/1934 | France | 191/38 |
| 1576944 | 8/1969 | France | 104/94 |
| 447912 | 3/1949 | Italy | 104/103 |
| 615220 | 1/1961 | Italy | 191/38 |

Primary Examiner—Richard A. Bertsch
Assistant Examiner—Ross Weaver
Attorney, Agent, or Firm—Joseph W. Farley

[57] ABSTRACT

A track construction for a self-propelled vehicle includes a pair of longitudinally extending track members connected in transversely spaced relation by arch-shaped yokes which extend upwardly over the track members and from which a conductor rail is suspended in vertically spaced centered relation with the track members, the conductor rail being engageable by collectors on the vehicle for powering a vehicle drive motor. At a junction between main and branch line track members and conductor rails, co-axially pivoted, independently movable, track and conductor rail switch tongues are mounted and are interconnected by a differential motion transmitting mechanism which causes one of the switch tongues to move between main and branch positions in response to a different extent of movement of the other switch tongue between such positions.

10 Claims, 7 Drawing Figures

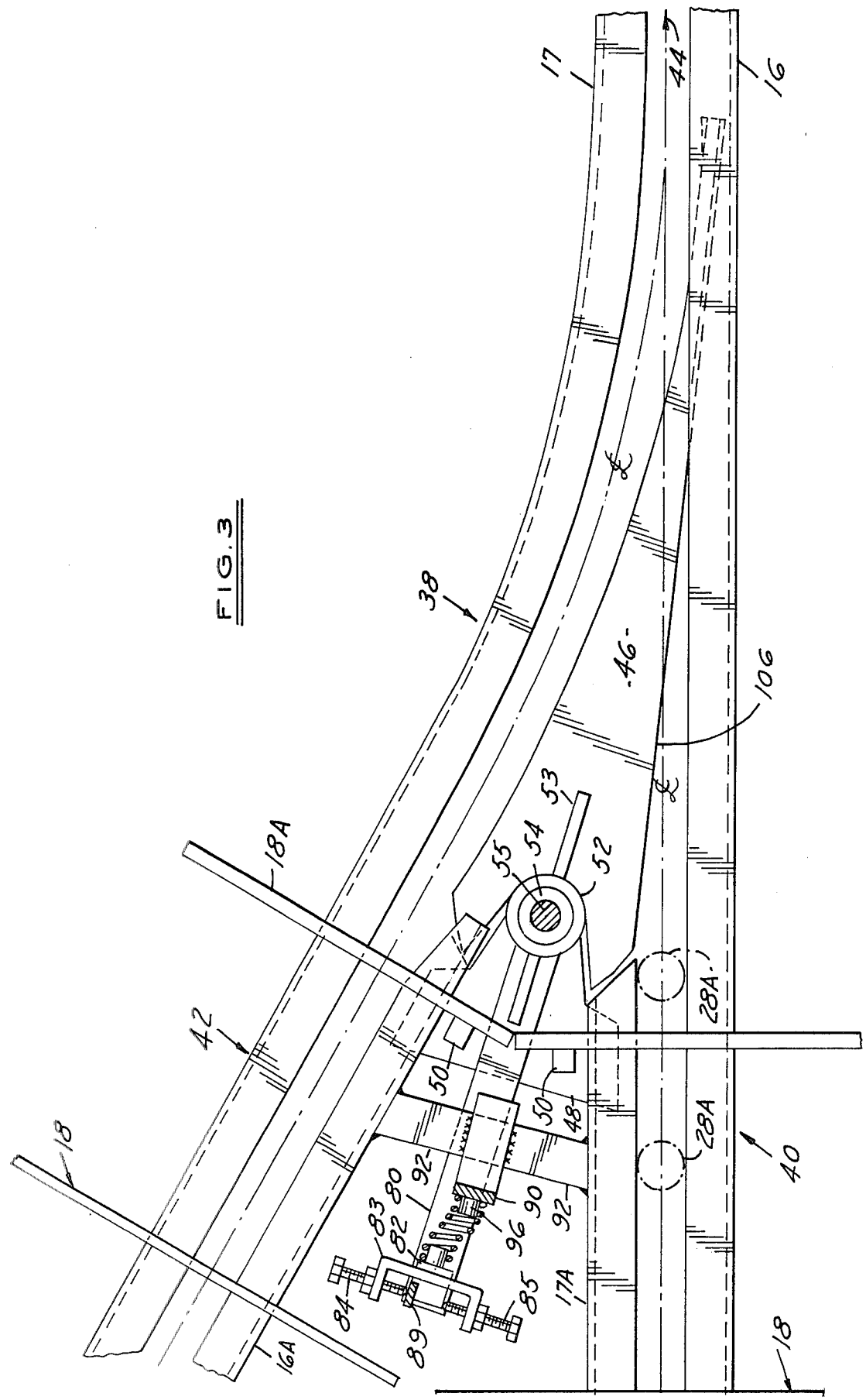

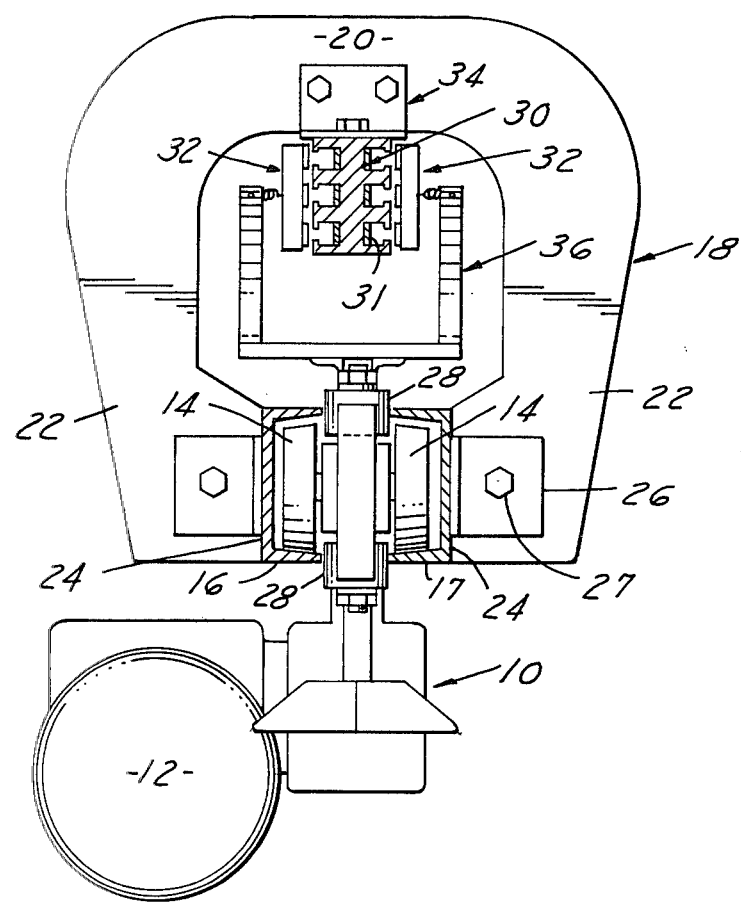
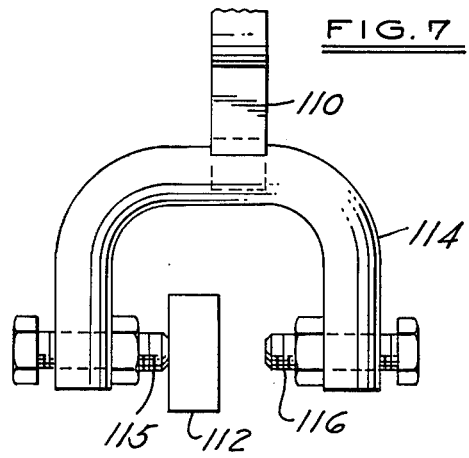

TRACK AND SWITCH CONSTRUCTION FOR SELF-PROPELLED VEHICLES

This is a continuation of application Ser. No. 892,774, filed Apr. 3, 1978, now abandoned.

This invention relates to improvements in a track and switch construction for a self-propelled rail-mounted vehicle of the type, sometimes referred to as a "monotractor", having collector shoes for deriving power for the vehicle driving motor from a conductor rail mounted adjacent to the vehicle supporting track.

The track construction commonly employed for such a monotractor vehicle consists of an I-beam mounted with its web in a vertical position so that the lower flanges of the I-beam form a pair of tracks engaged by wheels of the vehicle, and the undersurface of the lower flange of the I-beam is engaged by a traction wheel for propelling the vehicle. The conductor rail is usually composed of a plurality of conductor bars mounted on opposite sides of the web of the I-beam. In other prior forms of monotractor track arrangements, a pair of transversely spaced track members have been employed for supporting the wheels of the monotractor, with the conductor rail being arranged to one side or the other of this pair of track members. At junctions between a main track and a branch track, all of these prior constructions have required the use of a glide or stub type switch consisting of a pair of track sections—one for the branch path and one for the main path—mounted on a transversely movable carriage with each track section being provided with a complimentary section of conductor rail.

The overall object of the present invention is to provide an improved track section and switch construction employing a pair of longitudinally parallel, transversely spaced track members for supporting the wheels of the monotractor, and a conductor rail mounted above and between the track members so that the track members and conductor rail are in symmetrical relation to a centerline extending longitudinally of the track; and, to provide a pivoted or tongue type of switch for use at junctions between a main and branch track, thereby obtaining certain structural and operational advantages in the track system as a whole, and in the switch construction in comparison with the glide type of switch. These advantages will be hereinafter discussed in detail.

To summarize the invention, there is provided a track construction including a track for supporting the wheels of a self-propelled vehicle, and a conductor rail extending longitudinally parallel to the track, the conductor rail being engageable by collector means on the vehicle for energizing a vehicle drive motor, wherein the track is formed by a pair of longitudinally extending track members connected in transversely spaced parallel relation by arch-shaped yokes extending upwardly over the track members; and, the conductor rail is mounted above the track with the longitudinal centerline of the conductor rail in substantially vertical alignment with a longitudinal centerline midway between the pair of track members. A track switch tongue is pivotally mounted at a junction between a main line track and conductor rail and a branch line track and conductor rail, and the track switch tongue is movable between main and branch line positions. A conductor rail switch tongue including main and branch line sections of conductor rail is pivotally supported at the junction for movement between main and branch line positions in which the main and branch line conductor rail sections are respectively aligned with the main and branch line conductor rails, and the extent of movement of the conductor rail switch tongue is different than the extent of movement of the track switch tongue between the main and branch line positions thereof. Motion transmitting means are arranged between the switch tongues for pivotally and differentially moving one switch tongue in response to pivotal movement of the other switch tongue.

Preferably, the conductor rail switch tongue is a horizontal plate-like member having the main and branch line sections of conductor rail depending therefrom. This plate-like member is pivotally supported by a shaft which extends perpendicularly through the plate-like member and is attached thereto, the shaft being in turn supported by bearing means arranged in coaxial relation with the pivotal axis of the track switch tongue. Rollers attached to the plate-like member in radially spaced relation to the shaft engage a fixed supporting surface for maintaining the plate-like member in a horizontal position in which the conductor rail sections attached thereto align with the conductor rail sections of the main and branch tracks.

The track switch tongue and conductor rail switch tongue may be moved in unison, but in differential amounts, either by an actuating device connected to one of the switch tongues, or in response to engagement of the track switch tongue by a passing trolley in instances where the switch tongues extend from their respective pivots in the direction of movement of a vehicle along the track.

Other features and advantages of the invention will appear from the description to follow of the representative embodiments thereof disclosed in the accompanying drawings.

DESCRIPTION OF THE DRAWINGS

FIG. 3 is a sectional plan view taken on the line 3—3 of FIG. 1;

FIG. 4 is a sectional elevation, taken as indicated by the line 4—4 of FIG. 2 showing the track construction of the invention for supporting a self-propelled vehicle;

FIG. 7 is an enlarged detail elevation taken as indicated by the line 7—7 of FIG. 6.

DESCRIPTION OF THE PREFERRED EMBODIMENTS

Figure 1:
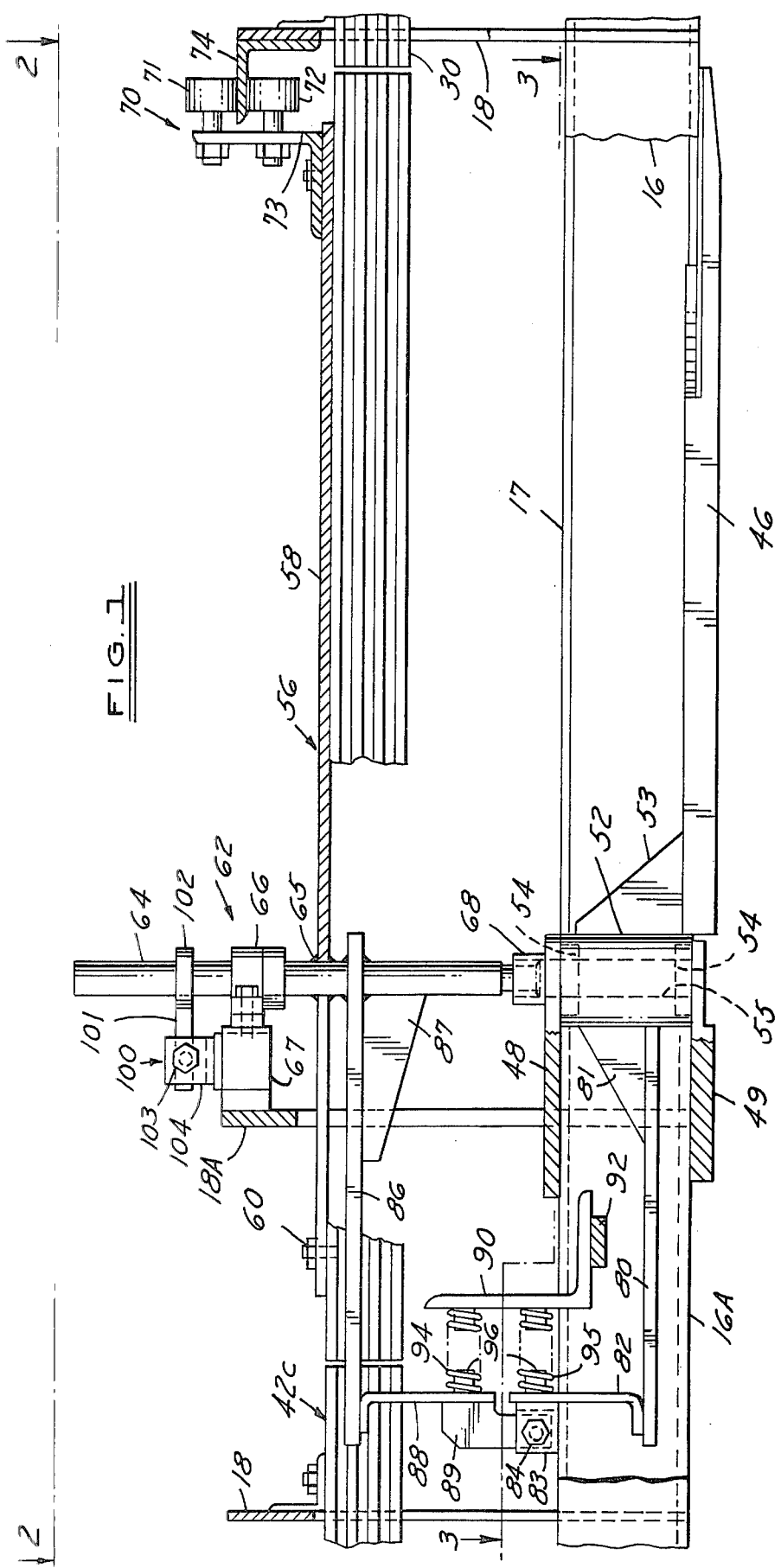
FIG. 1 is a sectional elevation, taken as indicated by the line 1—1 of FIG. 2, showing one form of track switch constructed in accordance with the invention.

The general arrangement of the track construction is shown by the sectional elevation, FIG. 4. A self-propelled vehicle, or monotractor 10, equipped with a drive motor 12, includes wheels 14 supported by a track consisting of a pair of longitudinally extending, transversely spaced track members 16 and 17, at least some of the wheels 14 being drivingly connected to the motor 12. The track members 16 and 17 are channel-shaped sections, as shown, and are connected together in transversely spaced relation by upwardly extending, arch-shaped yokes 18 placed at suitable intervals along the length of the track. Each yoke includes an upper, transversely extending portion 20 and a pair of transversely spaced portions, or legs 22, each leg 22 being connected to the vertical web 24 of one of the track members 16 or 17, the connection being made either by welding the leg of the yoke directly to the web of the track member, or by employing an angle bracket 26 which is welded to the web of the track member and suitably connected to the yoke, as by a bolt 27. The track members 16 and 17 are also engageable by guide rollers 28 on the vehicle to maintain the vehicle in centered relation with the track members.

A conductor rail 30 extends longitudinally parallel to the track members 16 and 17, and is engageable by collector means 32 on the vehicle 10 for energizing and controlling the vehicle drive motor 12. As shown in FIG. 4, the collector rail 30 is mounted by suitable means above and between the track members 16 and 17 and with the longitudinal centerline of the conductor rail in substantial vertical alignment with a longitudinal centerline extending midway between the track members 16 and 17. In other words, a characteristic of the track section of the invention is that the track members 16 and 17 and the conductor rail 30 are symmetrically arranged with respect to a common longitudinal centerline. The means for mounting the conductor rail 30 includes brackets 34 connected thereto and to the upper portion 20 of the track yokes 18. The conductor rail 30 is of conventional construction and has not been shown in detail. It includes a plurality of conductor bars 31 which may be employed for both energizing the vehicle drive motor and for controlling movement of the vehicle and operation of controllable elements of a monotractor system, such as track switches. The collector shoes 32 are also of conventional construction and have not been shown in detail. They are carried by a suitable bracket 36 connected to the vehicle 10.

Figure 2:
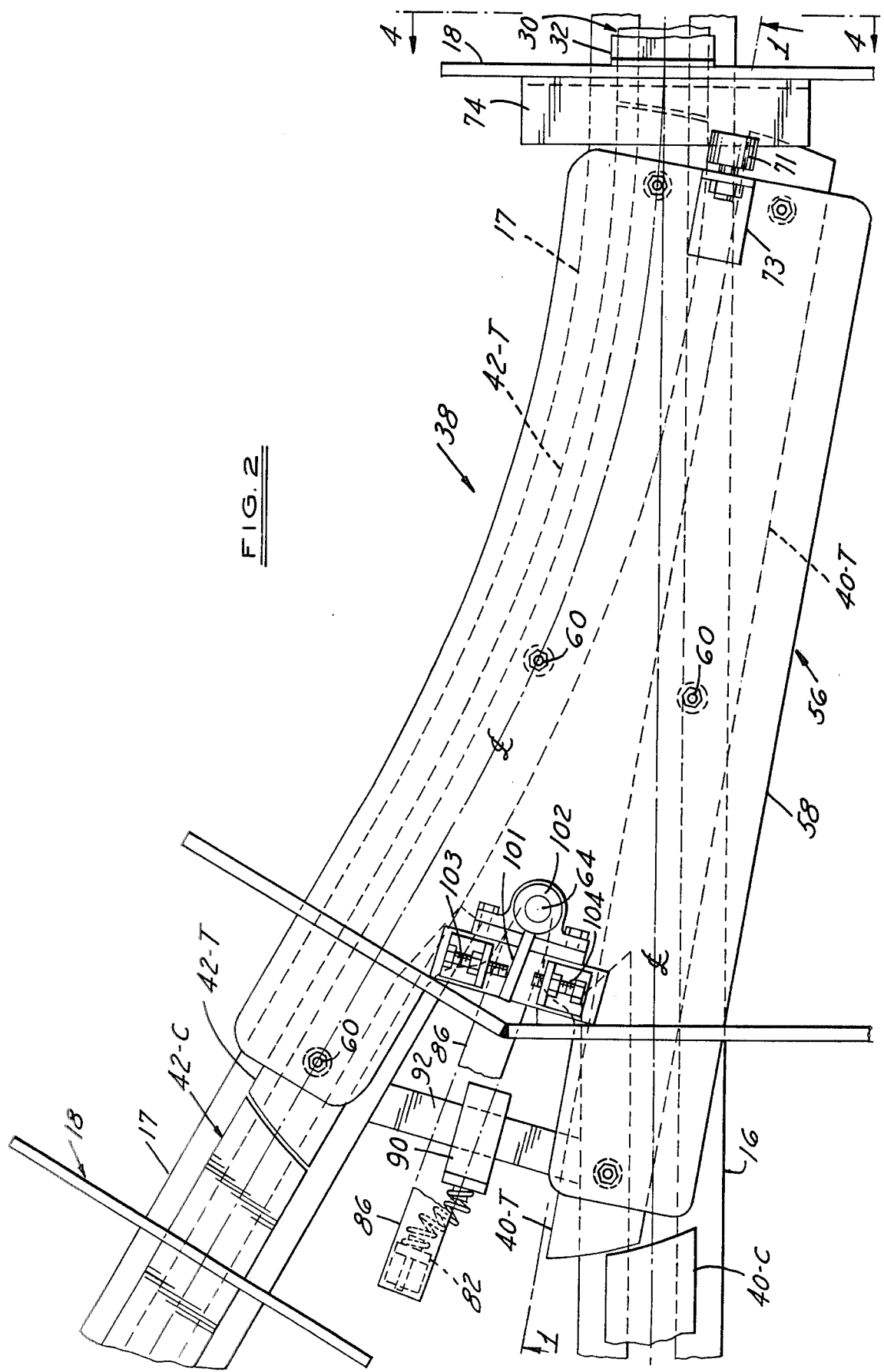
FIG. 2 is a plan view of the track switch, taken as indicated by the line 2—2 of FIG. 1.

FIGS. 1-3 illustrate one form of switch construction of the invention for use at a junction 38 between a main line track 40 and a branch line track 42, as shown in FIG. 3, the main line track 40 including a main line conductor rail 40C and the branch line track 42 including a branch line conductor rail 42C, as shown in FIG. 2.

Referring to FIG. 3, and to the normal direction of travel through the junction 38 as indicated by the arrow 44, the track member 17 of the branch line track 42 converges with the track member 16 of the main line track 40; and, a branch line track member 16A and a main line track member 17A terminate at the junction where a track switch tongue 46 forms a continuation of either of these terminal track members 16A and 17A. As shown in FIGS. 1 and 3, the terminal track members 16A and 17A are interconnected at the junction by an upper plate 48 and a lower plate 49, and vertical members 50 connect the upper plate 48 to a special track yoke 18A which extends across all of the track members and is connected to the track members 16 and 17.

The track switch tongue 46 is pivotally mounted at the junction by means including a collar 52 to which the switch tongue 46 is connected and reinforced by a gusset 53, and the collar is pivotally supported on suitable bearings 54 carried by a pivot bolt 55 extending between the lower plate 49 and the upper plate 48. Thus the tongue is pivotally mounted for movement between a main line position in which the tongue forms a connection between the main line track member 17A and the main line track member 17 and a branch line position shown in full line in FIG. 3 in which the tongue forms a connection between the branch line track member 16A and main line track member 16.

A conductor rail switch tongue 56 is shown in FIGS. 1 and 2 and includes a main line section of conductor rail 40T and a branch line section of conductor rail 42T. The conductor rail switch tongue 56 is formed by a plate-like member 58 to which the main and branch line sections of conductor rail 40T and 42T are connected in depending relation by suitable connectors 60. Mounting means 62, best shown in FIG. 1, pivotally supports the conductor rail switch tongue 56 at the junction for movement between main and branch line positions in which the main and branch line conductor rail sections 40T and 42T are respectively aligned with the main and branch line conductor rails 40C and 42C. This mounting means includes a pivot shaft 64 extending perpendicularly through the plate-like member 58 and attached thereto by welding as indicated by the reference numeral 65; and, the pivot shaft 64 is rotatably supported by an upper bearing 66 carried by a bracket 67 attached to the track yoke 18A and a lower bearing 68 mounted on the upper junction plate 48, the bearings 66 and 68 being arranged in coaxial relation with the pilot bolt 55 and bearings 54 of the track switch tongue 46. The plate-like member 58 is also supported vertically by roller means 70 mounted in radially spaced relation to the pivot shaft 64 and comprising an upper roller 71, a lower roller 72, and a bracket 73 to which the rollers are attached. An angle member 74 carried by a track yoke 18 provides a fixed supporting surface engaged between the vertically spaced rollers 71 and 72.

As can be seen from a comparison of FIGS. 2 and 3, the extent of pivotal movement of the conductor rail switch tongue 56 required to bring the main and branch line conductor rail sections 40T and 42T into alignment with their respective main and branch line conductor rails 40C and 42C is greater than the extent of movement of the track switch tongue in pivoting between its main and branch line positions. Accordingly, motion transmitting means are arranged between the switch tongues 46 and 56 for pivotally and differentially moving one switch tongue in response to pivotal movement of the other switch tongue. One form of such means is shown in FIGS. 1-3 and is operative to move the switch tongues differentially between main and branch line positions in response to engagement of the track switch tongue 46 by a guide roller 28A on a trolley (not shown) moving through the junction 38 in the direction of the arrow 44 of FIG. 3. Such a guide roller 28A would be carried by a pilot trolley (not shown) suitably connected to the monotractor 10 in leading relation therewith, thus automatically moving the switch as required.

The motion transmitting means comprises a first arm 80 connected to the switch tongue collar 52 by a gusset 81 so as to be movable with the track switch tongue 46. A bracket 82 connected to the arm 80 and extending vertically upward therefrom, as shown in FIG. 1, carries a motion transmitting yoke 83 (FIG. 3) provided with a pair of opposed, adjustable set screws 84 and 85. A second arm 86 is secured to the pivot shaft 64 with a gusset 87 so as to be movable with the conductor rail switch tongue 56. Attached to the second arm 86 is a depending bracket 88 carrying a tongue 89 which extends downwardly between the set screws 84 and 85 of the yoke 83. An angle section reaction member 90 is fixed to a bar 92 mounted between the terminal tracks 16A and 17A, as shown in FIG. 3; and, a pair of compression springs 94 and 95 engage posts 96 on the reaction member 90, the location of the posts 96 being approximately midway between the main and branch line positions of the switch tongues 46 and 56. The upper compression spring 94 in FIG. 1 engages a suitable post on the bracket 88 attached to the second arm 86 movable with the conductor rail switch tongue; the lower compression spring 95 engages a suitable post on the bracket 82 carried by the first arm 80 movable with the track switch tongue 46.

With the switch tongues 46 and 56 in their branch line positions as shown in FIGS. 2 and 3, the lower compression spring 95 exerts a force on the arm 80 tending to urge and retain the track switch tongue in the branch line position; similarly, the upper compression spring 94 exerts a similar force on the arm 86, urging the conductor rail switch tongue to a branch line position defined by a stop device 100 shown in FIGS. 1 and 2. This device includes an arm 101, projecting radially from a collar 102 secured to the pivot shaft 64, and engageable with adjustable abutment bolts 103 mounted on a U-shaped bracket 104 secured to the bearing mounting bracket 67.

If the trolley guide roller 28A in FIG. 3 is assumed to be moving in the direction of the arrow 44, engagement will take place between the roller 28A and the main line side face 106 of the track switch tongue 46, resulting in pivotal movement of the tongue 46 toward the main line position and in movement of the first arm 80 in a counter-clockwise direction as viewed in FIG. 3; and, the depending tongue 89 connected to the second arm 86 will be engaged by the set screw 84 thus transmitting this pivotal movement to the conductor rail switch tongue 56. As the pivotal movement of the track switch tongue continues, the arms 80 and 86 will pass a centered position relative to the fixed reaction member 90 and the compression springs 94 and 95 will produce the force necessary to complete the movement of their respective switch tongues 56 and 46 to the main line positions thereof, with differential movement being permitted to the extent of the spacing between the set screws 84 and 85.

Figure 5:
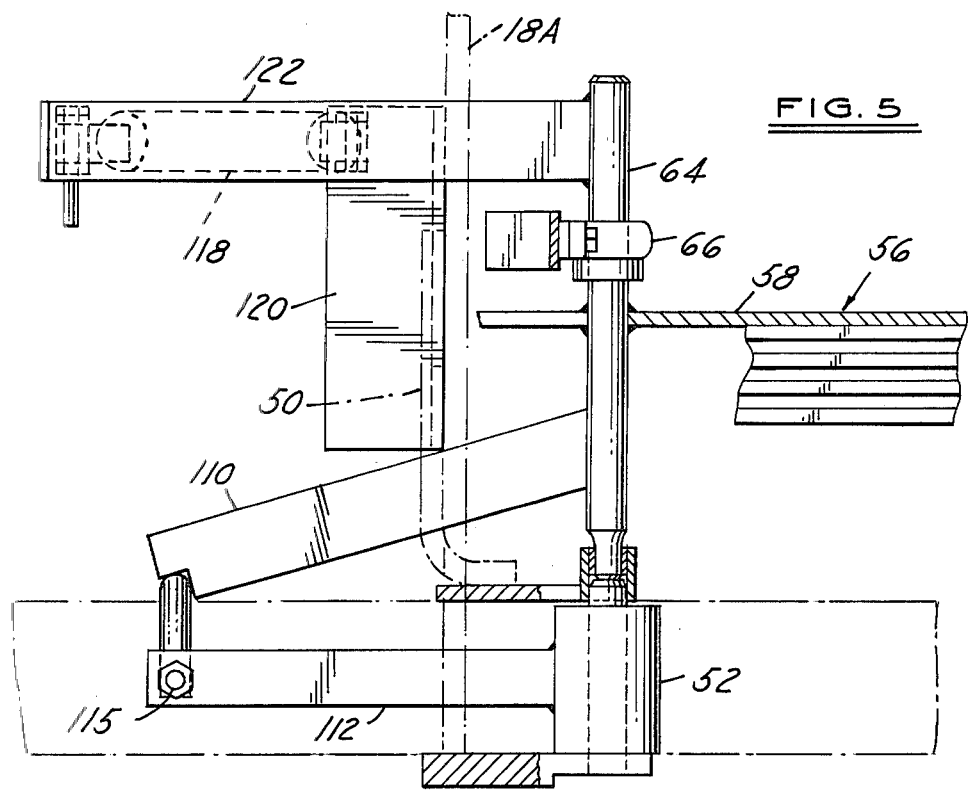
FIG. 5 is a fragmentary sectional elevation similar to a portion of FIG. 1 showing an alternate form of construction for activating the switch.
Figure 6:
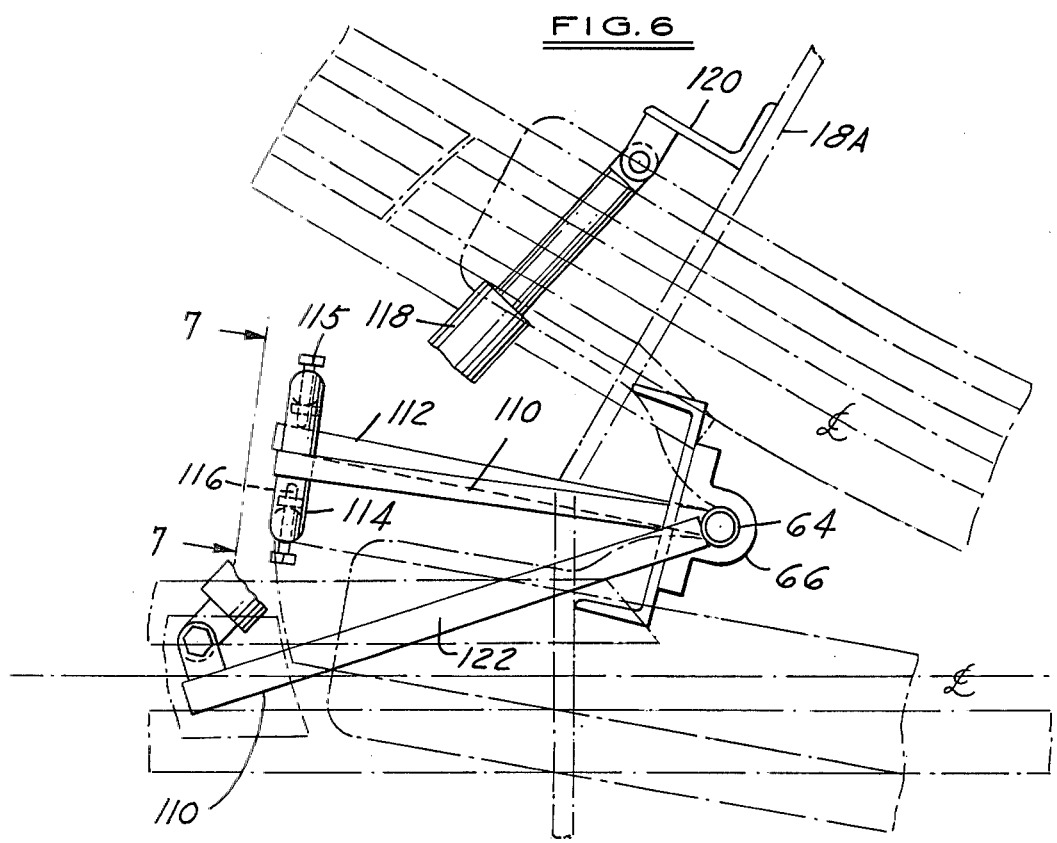
FIG. 6 is a plan view of the construction shown in FIG. 5.

A power actuated form of means for moving the switch tongues 46 and 56 pivotally and differentially is shown in FIGS. 5-7. In this form of the invention, the construction of the track switch tongue 46 and the conductor rail switch tongue 56, together with the pivotal mounting of each of these switch tongues is the same as has been previously described, and the motion transmitting means arranged between the switch tongues in these views is understood to be substituted for that previously described and shown in FIGS. 1-3.

In the alternate construction of FIGS. 5-7, a motion transmitting arm 110 is secured to the pivot shaft 64 for movement with the conductor rail switch tongue 56. A motion receiving arm 112 is structurally connected to the track switch tongue 46 through the collar 52. A differential motion transmitter is secured to the arm 110 and consists of a U-shaped member 114 shown in FIG. 7, equipped with adjustable abutments provided by set screws 115 and 116. Actuating means 118 is arranged between a bracket 120 carried by the track yoke 18A and an actuating arm 122 connected to the pivot shaft 64.

Thus, in this alternate construction, operation of the actuating means causes movement of the conductor rail switch tongue between main and branch line positions. This movement is transmitted through the arm 110 and the differential motion transmitter 114-116 to the motion receiving arm 112, thus causing a corresponding but differential movement of the track switch tongue 46.

The symmetrical track and conductor rail construction of the invention is similar in certain respects to one type of track construction conventionally employed in power and free conveyor systems, consisting of a similar pair of track members connected by arch-shaped yokes, but employs a conductor rail 30, instead of the conventional I-beam power track used in the power and free conveyor systems. This makes it readily possible to convert existing power and free conveyor systems to monotractor systems, by replacing the I-beam power track with a conductor rail 30. The track construction also combines with the pivoted type of track switch construction described herein, which is more economical, safer and requires less space than conventional glide type switch constructions. The symmetrical relation of the conductor rail and the mounting thereof overhead and between the vehicle tracks 16 and 17 enables the employment of the conductor rail 30 having a plurality of conductor bars arranged in back-to-back relation in a relatively limited space, and also permits the entire enclosure of the conductor bar assembly by suitable insulation rather than the individual insulation of each conductor bar.

Other features and advantages of the invention will be apparent to those skilled in the art.

I claim:

1. In a track construction including a pair of longitudinally extending transversely spaced track members for supporting the wheels of a self-propelled vehicle; arch-shaped yokes connecting the track members together at longitudinally spaced intervals, each yoke having an upper portion extending transversely above the track members; and a conductor rail supported by the upper portion of said yokes in vertically spaced symmetrical relation to the track members; a switch construction for a junction between a main line track and conductor rail converging in one direction with a branch line track and conductor rail; wherein the improvement comprises:

a track switch tongue;
means pivotally mounting the track switch tongue at the junction for movement between main and branch line positions;
a conductor rail switch tongue including main and branch line sections of conductor rail;
means pivotally supporting the conductor rail switch tongue at the junction for movement between main and branch line positions in which the main and branch line conductor rail sections are respectively aligned with the main and branch line conductor rails;
the extent of movement of said conductor rail switch tongue being different from the extent of movement of said track switch tongue between the main and branch line positions of said switch tongues;
means for pivotally moving one of said switch tongues between main and branch line positions; and
motion transmitting means connected to each of said switch tongues for pivotally and differentially moving the other of said switch tongues in response to pivotal movement of said one switch tongue, said motion transmitting means extending from the switch tongues in a direction opposite to said converging direction of the tracks and conductor rails and being arranged substantially within the vertical spacing between the track members and the conductor rails.

2. In a track construction including a pair of longitudinally extending transversely spaced track members for supporting the wheels of a self-propelled vehicle; arch-shaped yokes connecting the track members together at longitudinally spaced intervals, each yoke having an upper portion extending transversely above the track members; and a conductor rail supported by the upper portion of said yokes in vertically spaced symmetrical relation to the track members; a switch construction for a junction between a main line track and conductor rail converging in one direction with a branch line track and conductor rail; wherein the improvement comprises:

a track switch tongue;

means pivotally mounting the track switch tongue at the junction for movement between main and branch line positions;

a conductor rail switch tongue including main and branch line sections of conductor rail;

means pivotally supporting the conductor rail switch tongue at the junction for movement between main and branch line positions in which the main and branch line conductor rail sections are respectively aligned with the main and branch line conductor rails;

the extent of movement of said conductor rail switch tongue being different from the extent of movement of said track switch tongue between the main and branch line positions of said switch tongues;

means for pivotally moving one of said switch tongues between main and branch line positions;

motion transmitting means connected to each of said switch tongues for pivotally and differentially moving the other of said switch tongues in response to pivotal movement of said one switch tongue; and, the means pivotally mounting the track switch tongue and the means pivotally supporting the conductor rail switch tongue comprising co-axial independent pivot means including a fixed pivot bolt carried by the track members, a collar attached to the track switch tongue and pivotally supported by the pivot bolt, a shaft attached to the conductor rail switch tongue, and bearing means carried by one of said yokes and by said pivot bolt for supporting said shaft in end-to-end axial alignment with said pivot bolt.

3. A track construction according to claim 1 wherein the means pivotally supporting the conductor rail switch tongue includes a shaft secured to the conductor rail switch tongue, bearing means supporting the shaft, and supporting means carried by the conductor rail switch tongue in radially spaced relation to the shaft.

4. A track construction according to claim 1 wherein the conductor rail switch tongue is a horizontal plate-like member having said main and branch line sections of conductor rail depending therefrom, and the means pivotally supporting the conductor rail switch tongue comprises a shaft extending perpendicularly through said plate-like member and attached thereto, bearing means for supporting the shaft, and supporting roller means carried by the plate-like member in radially spaced relation to the shaft, the roller means engaging a fixed supporting surface.

5. A track construction according to claim 1 wherein said means for pivotally moving one of said switch tongues includes actuating means operatively associated with said one switch tongue.

6. A track construction according to claim 5 wherein said one switch tongue is the conductor rail switch tongue.

7. A track construction according to claim 6 wherein said motion transmitting means includes a motion transmitting arm, means mounting said motion transmitting arm for movement with said conductor rail switch tongue, a motion receiving arm structurally connected to said track switch tongue, and differential motion transmitter carried by one of said arms and engageable with the other of said arms.

8. A track construction according to claim 1 wherein said motion transmitting means comprises a first arm movable with the track switch tongue, a second arm movable with the conductor rail switch tongue, a differential motion transmitter carried by one of said arms and engageable with the other of said arms, a fixed reaction member mounted adjacent to said arms, and a pair of compression springs engaging said reaction member in positions located approximately midway between the main and branch line positions of said switch tongues, one of said springs also engaging said first arm and the other of said springs also engaging said second arm.

9. A track construction according to claim 8 wherein said track switch tongue is arranged so as to be movable between main and branch line positions in response to engagement by a trolley moving on the main and branch line tracks, respectively.

10. A track construction according to claim 1 wherein said motion transmitting means includes a motion transmitting arm, means mounting said motion transmitting arm for movement with said one switch tongue, a motion receiving arm structurally connected to the other of said switch tongues, and a differential motion transmitter carrried by one of said arms and engageable with the other of said arms.

* * * * *